United States Patent
Mao et al.

(10) Patent No.: US 7,594,258 B2
(45) Date of Patent: Sep. 22, 2009

(54) ACCESS CONTROL SYSTEMS AND METHODS USING VISIBILITY TOKENS WITH AUTOMATIC PROPAGATION

(75) Inventors: Jianchang Mao, San Jose, CA (US); Zhichen Xu, San Jose, CA (US); Chad Walters, San Francisco, CA (US); John Wang, San Jose, CA (US); Albert Meltzer, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 829 days.

(21) Appl. No.: 11/169,178

(22) Filed: Jun. 27, 2005

(65) Prior Publication Data

US 2006/0294192 A1    Dec. 28, 2006

(51) Int. Cl.
*H04L 29/06* (2006.01)
(52) U.S. Cl. ............................................. 726/9; 726/27
(58) Field of Classification Search .................. 713/185, 713/159, 193–194; 726/9–10, 17–21, 27, 726/30
See application file for complete search history.

(56) References Cited

U.S. PATENT DOCUMENTS

2004/0128556 A1* 7/2004 Burnett ........................ 713/201
2004/0255140 A1* 12/2004 Margolus et al. ............ 713/193
2005/0278546 A1* 12/2005 Babineau et al. ............ 713/185

OTHER PUBLICATIONS

Kwok, Sai. "Digital Rights Management for the Online Music Business." ACM SIGecom Exchanges 3.3(2002): 17-24.*

* cited by examiner

*Primary Examiner*—Gilberto Barron, Jr.
*Assistant Examiner*—Venkat Perungavoor
(74) *Attorney, Agent, or Firm*—Seth H. Ostrow; Ostrow Kaufman & Frankl LLP

(57) ABSTRACT

Access control systems and methods regulate access to shared content items in a corpus using visibility tokens. A user provides other users with access to a content item by associating a content token with the content item and associating a matching user token with each user who is to be granted access. A user who attempts to access the content item succeeds only if that user has a user token matching the content token associated with the content item. User tokens can be propagated automatically from one user to another, e.g., based on trust relationships among the users. Content tokens can be indexed with content items so that when a user searches the corpus, a search engine can detect matches between user tokens and content tokens and filter the search results based on whether they are visible to the querying user.

24 Claims, 9 Drawing Sheets

601

| USER ID | USER TOKENS |
|---|---|
| <user A> | <f1/C>, <f2/B>, <f2/D> |
| <user B> | <f1/A>, <f1/C> |
| <user C> | <f1/A>, <f1/B>, <f1/D> |
| <user D> | <f1/A>, <f3/B>, <f2/C> |
| <user E> | <f2/A>, <f1/B>, <f2/C>, <f3/D> |
| <user F> | <f2/A>, <f2/B>, <f1/C>, <f1/D> |
| <user G> | <f2/A>, <f2/B>, <f1/C>, <f2/D>, <f1/H> |
| <user H> | <f3/A>, <f3/B>, <f2/C>, <f3/D>, <f1/G> |
| <user I> | <f1/A>, <f2/B>, <f2/C>, <f3/D> |

| ANNOT. ID | PAGE REF. | CONTENT TOKEN | VISIBLE TO |
|---|---|---|---|
| <651> | <611> | <pri/A> | A |
| <652> | <612> | <pri/H> | H |
| <653> | <612> | <pub/B> | A,B,C,D,E,F,G,H,I |
| <654> | <613> | <f2/A>,<gr1/A> | A,B,C,D,E,F,G,I |
| <655> | <613> | <f2/B> | A,B,C,E,F,G,I |
| <656> | <613> | <f1/C> | A,B,C,F,G |
| <657> | <614> | <f2/D> | A,B,C,D,F,G |
| <658> | <615> | <sel/D> | A,B,D |
| ⋮ | ⋮ | ⋮ | ⋮ |

| PAGE ID | CONTENT TOKENS | VISIBLE TO |
|---|---|---|
| <611> | <pri/A> | A |
| <612> | <pri/H>, <pub/B> | A,B,C,D,E,F,G,H,I |
| <613> | <f2/A>, <f2/B>, <f1/C> | A,B,C,D,E,F,G,I |
| <614> | <f2/D> | A, C,D,F,G |
| <615> | <sel/D> | A,B,D |
| ⋮ | ⋮ | ⋮ |

FIG. 6C

ACCESS CONTROL SYSTEMS AND METHODS USING VISIBILITY TOKENS WITH AUTOMATIC PROPAGATION

CROSS-REFERENCES TO RELATED APPLICATIONS

The present disclosure is related to commonly-assigned co-pending U.S. patent application Ser. No. 11/082,202, filed Mar. 15, 2005, entitled "Search System and Methods With Integration of User Annotations From a Trust Network," which disclosure is incorporated herein by reference for all purposes.

BACKGROUND OF THE INVENTION

The present invention relates in general to systems and methods for sharing content items among users, and in particular to systems and methods for controlling access to shared content items using token propagation.

The World Wide Web (Web), among many other uses, provides a platform for communities of users (e.g., friends, families, or users with some common interest) to exchange information with each other. In recent years, numerous sites have been created at which users can register as members and then sign in to post their own content and view content provided by other members. Many types of content can be shared, including photos and media files, bookmarks (links to Web pages that a user finds interesting), ratings and/or comments on Web pages or various real-world entities (restaurants, shops, movies, etc.), and so on. Virtually any content users create can, in principle, be posted to the Web and shared with others.

Some content-sharing sites provide discrete communities that a user chooses to join. Each community is usually defined around some relationship (e.g., family members) or common interest (e.g., a hobby or career). After joining, the user can post content to a "shared library" that is available to all members of the community. Depending on the site, all members can browse and/or search the library of shared content.

Sites organized in this manner have certain limitations. For instance, the typical user has many interests and social connections, and a given content item might be of interest to multiple communities. At a community-based site, the user would need to post the content in multiple places to make it visible to multiple communities. In addition, users of such sites tend to post only content that they are willing to share with all members of a community.

Another type of content-sharing site is based on a social network (or trust network) model of user relationships. In the social network model, discrete communities are not identified. Instead, each user who joins the network identifies one or more other users as trusted users (sometimes referred to as "friends"); trust relationships can be unidirectional or bidirectional. The social network is built up by defining links from a user to his friends, from his friends to their friends, and so on. Like other content sharing sites, members of a social network site can access a browsable and/or searchable shared library of content.

From the user's perspective, the social network model simplifies the task of sharing content. After identifying his friends, a user can post content to the sharing site, and the content becomes accessible to the users he trusts, and often to the users they trust. However, the posting user generally does not know who (apart from his friends) is a member of the network, and this fact may make users reluctant to post content that they do not want made public.

To encourage more content sharing in such systems, effective access control is needed. Ideally, a posting user would be able to specify a visibility rule for each content item he posts, thereby controlling how broadly the item is to be shared (e.g., with friends only, with friends of friends, with friends of friends of friends, etc.). During browsing and/or searching of the shared library, a querying user would see a content item only if she is within its visibility rule.

Implementing this model presents several difficulties. First, a server system that provides access to the shared library must determine the visibility rule for a given content item on demand. Then the server system must determine whether a querying user qualifies for access under the applicable rule. The latter determination is further complicated because of the way relationships are typically represented in social network databases. Specifically, if a first user trusts a second user, the trust relationship is reflected in the first user's record in the database but not in the second user's record. If the second user trusts a third user, the second user's record shows that relationship, but the third user's record does not show a relationship to either the second or first users. Thus, when the third user submits a query, it is not immediately apparent from the posted content item or the third user's database record that she should have access to content items posted by the first user with a visibility rule that includes "friends of friends" or even that she should have access to content items posted by the second user with a visibility rule that includes "friends." While these facts can be determined, making such determinations takes time, slowing the overall server response. And as the social network expands, the response time to users' requests for information from the library increases.

One solution is to provide an access control list for each content item, listing the users who have access to that item. However, every time a relationship in the network changes, the access control lists must be updated; given a large enough number of documents, this procedure becomes prohibitive.

It would therefore be desirable to provide access control systems and methods usable in a social network environment to efficiently determine which content items should be made accessible to a given user.

BRIEF SUMMARY OF THE INVENTION

Embodiments of the present invention provide systems and methods for controlling access to content items in a corpus (e.g., Web pages, annotations of Web pages, images, photos, media files or the like) using visibility tokens. In one embodiment, a user provides other users with access to a content item by associating a content token with the content item and associating a matching user token with each user who is to be granted access. A user who attempts to access the content item succeeds only if that user has a token matching the visibility token associated with the content item. The tokens are advantageously defined to represent visibility policies rather than individual content items so that a user can associate the same content token with multiple content items, thereby reducing the number of distinct tokens required. In some embodiments, multiple users can associate content tokens with the same content item, and access to the content item is granted to any user who has at least one user token that matches one of the content tokens. In some embodiments, user tokens can be propagated automatically from one user to another, e.g., based on trust relationships among the users. In some embodiments, the corpus is searchable, and when a user searches the corpus, a search engine can detect matches between user tokens and content tokens and filter the search results based on whether they are visible to the querying user.

According to one aspect of the invention, a method for sharing content items among a number of users includes defining a first user token and a first content token, where the first user token and the first content token each represent a first visibility policy for determining which of the users are granted access to content items posted by a first one of the users and where the first user token and the first content token are matching tokens. The first user token is associated with each user who is granted access to content items according to the first visibility policy. A visibility instruction is received for a first content item from the first user, the visibility instruction indicating that the first content item should be shared according to the first visibility policy. In response to the visibility instruction, the first content token is associated with the first content item in an index of content items so that when one of the users requests access to the first content item, the request is granted or denied based on whether the first content token matches a user token associated with the requesting user.

Any type of content item can be stored. In one embodiment, the content items include annotations created by the users, wherein each annotation is associated with a subject document (e.g., a Web page) to which the annotation relates. In other embodiments, the content items might include photos or other images, media files (e.g., audio and/or video data), documents, Web pages, or any other type of content item.

The tokens may have various forms, and the first user token and the first content token are identical tokens might or might not be identical tokens.

Multiple visibility policies can be represented using different tokens. For instance, the method might also include defining a second user token and a second content token, where the second user token and the second content token each represent a second visibility policy for determining whether a particular one of the plurality of users is granted access to content items posted by the first user and where the second user token and the second content token are matching tokens. The second user token can be associated with each user who is granted access to content items according to the second visibility policy. The method might also include receiving a visibility instruction for a second content item from the first user, the second visibility instruction indicating that the second content item should be shared according to the second visibility policy. In response to the visibility instruction for the second content item, the second content token is associated with the second content item in the index of content items so that when one of the users requests access to the second content item, the request is granted or denied based on whether the second content token matches a user token associated with the user.

In some embodiments, visibility policies with overlapping scope can be represented by defining suitable matching rules. For instance, under one matching rule the second user token also matches the first content token but the first user token does not match the second content token. This has the effect that a user associated with the second user token would be granted access to content items associated with the first or second content token, while a user associated with the first user token would be granted access to content items associated with the first content token but not to content items associated with the second content token.

In some embodiments, the corpus of shared content items is searchable, and the method further includes receiving a query from a querying one of the users. In response to the query, one or more content items are selected from the index to return as search hits; the first content item is not selected as a search hit unless the querying user is associated with a user token that matches the first content token.

In some embodiments, the act of associating the first user token with each user who is granted access to content items according to the first visibility policy is performed automatically. For instance, the first visibility policy can be defined by reference to a maximum degree of separation in a trust network connecting the first user to others of the plurality of users. Where the maximum degree of separation is at least one, the act of associating the first user token with each user who is granted access to content items according to the first visibility policy can include accessing trust network data for the trust network to identify one or more users who are friends of the first user and associating the first user token with each of the friends of the first user. Where the maximum degree of separation is at least two, the act of associating the first user token with each user who is granted access to content items according to the first visibility policy can also includes accessing trust network data for the trust network to identify one or more users who are friends of the friends of the first user and associating the first user token with each of the friends of the friends of the first user.

According to another aspect of the present invention, a method of searching a corpus of shared content items posted by a number of users includes receiving a query from a querying one of the users; the querying user is associated with a set of user tokens, each of which represents a visibility policy under which the querying user is granted access to content items posted by one of the users. An index of the shared content items is accessed, where each shared content item in the index is associated with a content token that represents a visibility policy for determining which of the users are granted access to content items posted by one of the users. From the index, at least one of the shared content items is identified as a search hit that satisfies the query. A visibility filter is applied to each of the search hits, where the visibility filter is satisfied in the event that the search hit is associated with a content token that matches a user token in the set of user tokens associated with the querying user. A list of search hits that satisfy the visibility filter is returned to the querying user.

In some embodiments, the acts of receiving the query and returning the list of search hits are performed by a front end module configured to communicate with a user system and the acts of accessing the index, identifying the search hits and applying the visibility filter are performed by a search engine communicably coupled to the front end module. As described below, applying visibility filters in the search engine rather than the front end module can result in improved search response time.

Visibility filtering can be done in various ways. In some embodiments, a hash table is built, based on the one or more user tokens associated with the querying user. For each search hit, the content tokens associated with the search hit are compared to the user tokens using the hash table. The content tokens associated with a search hit can be retrieved from the index or they can be retrieved from a visibility token cache.

In other embodiments, visibility filtering includes constructing a visibility bit vector based on the set of user tokens associated with the querying user, where each bit in the visibility bit vector corresponds to one of the shared content items in the corpus and where the value of each bit indicates whether the corresponding one of the shared content items has an associated content token that matches any of the user tokens in the set of user tokens. For each search hit, the value of the corresponding bit in the bit vector is used to determine whether the shared content item is visible to the querying user. Once constructed, the visibility bit vector can be stored in association with the set of user tokens in a visibility filter cache from which the visibility bit vector is retrievable by reference to the set of user tokens. In response to a subsequent query from the querying user, the visibility bit vector can be retrieved from the visibility filter cache rather than being reconstructed.

According to yet another aspect of the present invention, a method of searching a corpus of shared content items posted by a number of users includes receiving a query from a querying one of the users, where the querying user is associated with a set of user tokens, each user token representing a visibility policy under which the querying user is granted access to content items posted by one of the users. The query is reformulated to include the received query and a logical OR of the one or more user tokens associated with the querying user. An index of the corpus of shared content items is accessed, where each shared content item in the index is associated with a content token that represents a visibility policy for determining which of the plurality of users are granted access to content items posted by one of the plurality of users. The reformulated query is processed by reference to the index, thereby identifying one or more visible search hits from the corpus of shared content items; each visible search hit is a content item from the corpus that satisfies the received query and that is associated with a content token that matches a user token in the set of user tokens associated with the querying user. A listing of the visible search hits is returned to the user.

In some embodiments, the acts of receiving the query and returning the listing of the visible search hits are performed by a front end module configured to communicate with a user system, and the acts of reformulating the query, accessing the index and processing the reformulated query are performed by a search engine communicably coupled to the front end module.

According to a further aspect of the present invention, a computer system for sharing content items among a plurality of users includes a user data store, a content data store, posting control logic, and access control logic. The user data store is configured to store a user record for each of the users, with the user record for each user including one or more user tokens associated with that user, where each user token representing a visibility policy under which that user is granted access to content items posted by one of the users. The content data store is configured to store an item record for each of the shared content items, wherein item record includes one or more content tokens, each content token representing a visibility policy for determining which of the users are granted access to content items posted by one of the users. The posting control logic is configured to receive a visibility instruction for a first one of the shared content items from a first one of the users, the visibility instruction indicating that the first content item should be shared according to a first visibility policy, and to store a first content token in the item record for the first shared content item, the first content token representing the first visibility policy. The access control logic is configured to receive a request from a requesting one of the plurality of users to access the first shared content item and to grant access in the event that one of the user tokens in the user record for the requesting user matches a content token associated with the first content item.

In some embodiments, the user record for each user further includes trust network data identifying one or more other users as being friends of that user, and each user token represents a visibility policy that is defined by reference to a maximum degree of separation in the trust network from a posting user. The system can also include token propagation control logic configured to automatically determine which user records should include each user token based on the visibility policy and the trust network data and to automatically add user tokens to user records based on the automatic determination.

According to a still further aspect of the present invention, a computer system for searching a corpus of shared content items posted by users includes a user data store, a content data store, a front end module, and a search engine. The user data store is configured to store a user record for each of the users, with the user record for each user including one or more user tokens associated with that user, where each user token representing a visibility policy under which that user is granted access to content items posted by one of the users. The content data store is configured to store an item record for each of the shared content items, wherein item record includes one or more content tokens, each content token representing a visibility policy for determining which of the users are granted access to content items posted by one of the users. The front end module is configured to receive a query from a querying one of the users, to extract from the user data store a set of user tokens associated with the querying user, and to return a search report including a listing of search hits to the querying user. The search engine is communicably coupled to the front end module and is configured to receive the query and the set of user tokens from the front end module, to identify content items that satisfy the query and that are visible to the querying user, and to return the identified content items as search hits to the front end module. The search engine is further configured to determine whether a content item is visible to the querying user by determining whether the content item is associated with a content token that matches a user token in the set of user tokens.

The following detailed description together with the accompanying drawings will provide a better understanding of the nature and advantages of the present invention.

BRIEF DESCRIPTION OF THE DRAWINGS

FIGS. 6A-6C are tables illustrating an example of access control using visibility tokens according to an embodiment of the present invention.

DETAILED DESCRIPTION OF THE INVENTION

Embodiments of the present invention provide systems and methods for controlling access to content items in a corpus (e.g., Web pages, annotations of Web pages, images, photos, media files or the like) using visibility tokens. In one embodiment, a user provides other users with access to a content item by associating a content token with the content item and associating a matching user token with each user who is to be granted access. A user who attempts to access the content item succeeds only if that user has a token matching the visibility token associated with the content item. The tokens are advantageously defined to represent visibility policies rather than individual content items so that a user can associate the same content token with multiple content items, thereby reducing the number of distinct tokens required. In some embodiments, multiple users can associate content tokens with the same content item, and access to the content item is granted to any user who has at least one user token that matches one of the content tokens. In some embodiments, user tokens can be propagated automatically from one user to another, e.g., based on trust relationships among the users. In some embodiments, the corpus is searchable, and when a user searches the corpus, a search engine can detect matches between user tokens and content tokens and filter the search results based on whether they are visible to the querying user.

In some embodiments, visibility tokens are used internally to a search engine to perform filtering in accordance with visibility rules during a search of a shared library of content items where some of the content are subject to restrictions.

I. Overview

A. Network Implementation Overview

Figure 1:
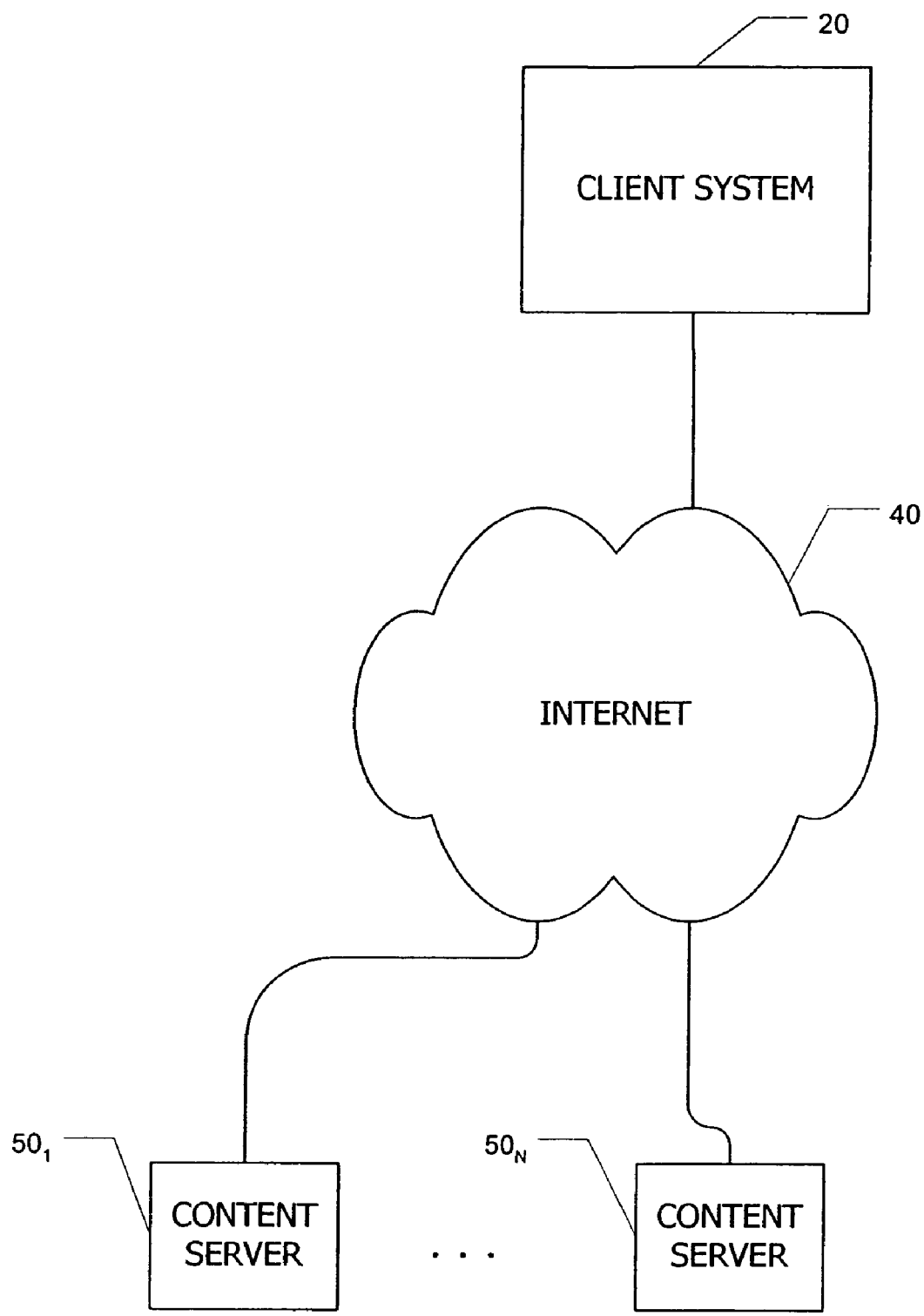
FIG. 1 illustrates a general overview of an information retrieval and communication network according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. Client system 20 is configured to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$, to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search and Annotation System Overview

Figure 2:
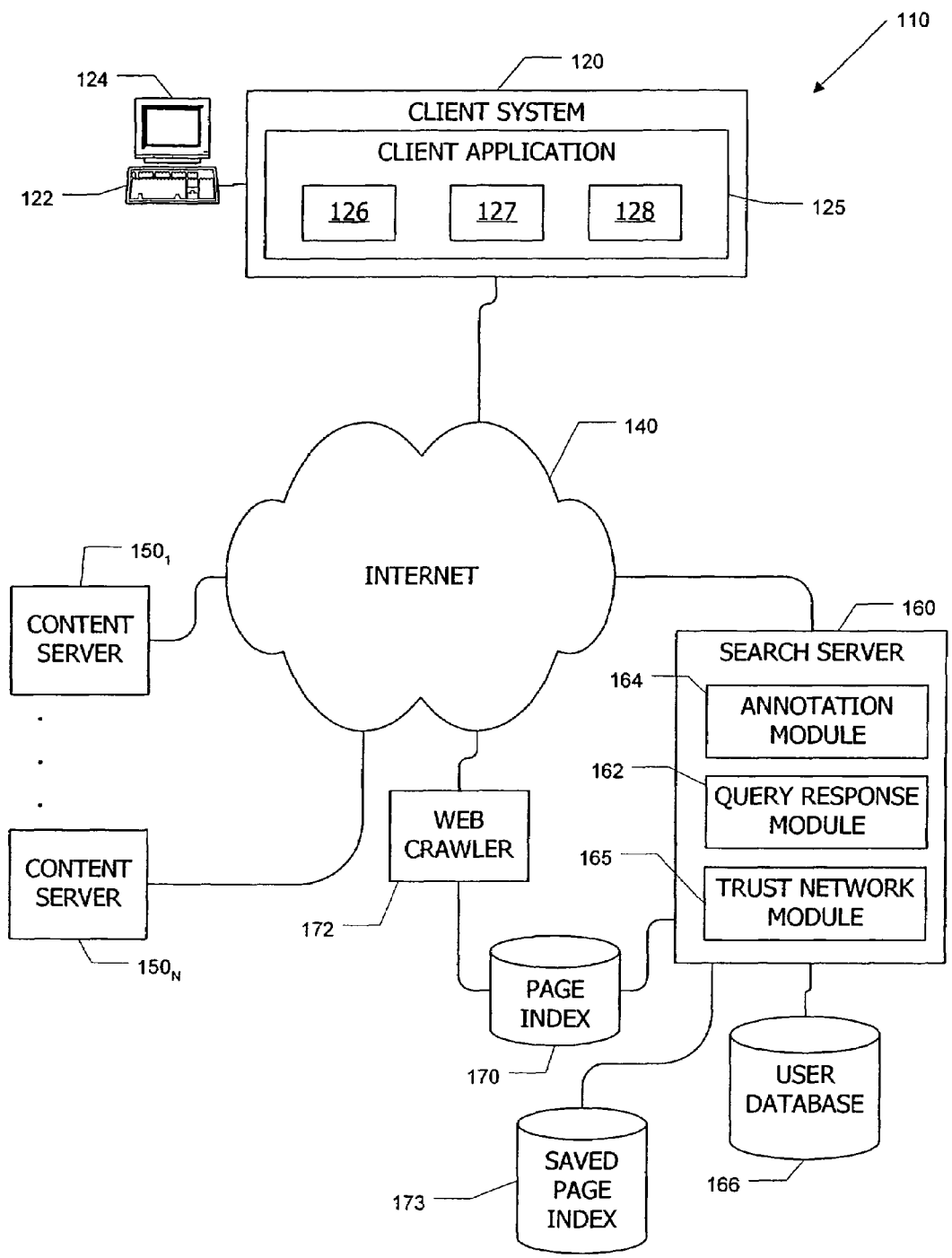
FIG. 2 illustrates another information retrieval and communication network for communicating media content according to an embodiment of the invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As described above, client system 120 and its components are configured to communicate with server systems 150 and 160 and other server systems over Internet 140 or other communication networks.

to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as described above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as Web pages to client system 120, for example, in response to links selected in search result pages provided by search server system 160. In some variations, search server system 160 returns content as well as, or instead of, links and/or other references to content. Search server system 160 includes a query response module 162 configured to receive a query from a user and generate search result data therefor, a user annotation module 164 configured to manage user interaction with user-supplied annotation information, and a trust network module 165 configured to manage a trust network for the user. Search server system 160 is communicably coupled to a user database 166 that stores data pertaining to specific users of search server system 160 and to page indexes 170 and 173 that provide an index to the corpus to be searched (in some instances, the World Wide Web). Personalization database 166 and page indexes 170 and 173 may be implemented using generally conventional database technologies.

In accordance with some embodiments of the present invention, users interact with search server 160 to "save" content items that are of interest to them. Users can also associate metadata, such as descriptive or evaluative comments, with their saved content items (when they save the item or at a later time). When a user saves a content item, an annotation record (also referred to herein as an "annotation") is stored that includes a reference to the content item (e.g., a URL) and/or a copy of the content item, along with any user-added metadata. The store of annotations is searchable by users, and a given annotation can be viewed by the user who saved it and also by other users who are trusted by the user who saved it. Examples of systems and methods for collecting and searching annotations are described in above-referenced application Ser. No. 11/082,202.

In one embodiment, search server 160 includes an annotation module 164 configured to interact with client system 120 to support users' creation and editing of annotations. In one embodiment, client application 125 includes an interface by which the user can create a new annotation and transmit it to annotation module 164. Annotation module 164 stores the annotation in user database 166.

Query response module 162 is configured to provide data responsive to various search requests (queries) received from a client system 120, in particular from search module 126. As used herein, the term "query" encompasses any request from a user (e.g., via client 120) to search server 160 that can be satisfied by searching the Web (or other corpus) as indexed in page index 170. In one embodiment, a user is presented with a search interface via search module 126. The interface may include a text box into which a user may enter a query (e.g., by typing), check boxes and/or radio buttons for selecting from predefined queries, a directory or other structure enabling the querying user to limit search to a predefined subset of the full search corpus (e.g., to pages that have been annotated by users of search server 160), etc. Any search interface may be used; examples of search interfaces for searching shared annotations are described in above-referenced application Ser. No. 11/082,202.

Query response module 162 in one embodiment references a page index 170 that is populated with, e.g., pages, links to pages, data representing the content of indexed pages, etc. Page index 170 may be generated by various collection technologies including an automatic web crawler 172, and/or various spiders, etc., as well as manual or semi-automatic classification algorithms and interfaces for classifying and ranking web pages within a hierarchical structure. These technologies may be implemented in search server system 160 or in a separate system (e.g., web crawler 172) that generates a page index 170 and makes it available to search server system 160. Various page index implementations and formats are known in the art and may be used for page index 170, and multiple page indexes 170 may be provided.

In some embodiments, annotation data from user database 166 is added to page index 170. For each page that has been annotated by one or more users, page index 170 can include the annotation data provided by each annotating user. Thus, an entry in page index 170 may include any number (zero or more) of annotations, in addition to a representation of the page content. In other embodiments, a separate "saved page" index 173 is created that represents only pages that have been saved as annotations by at least one user. For example, an annotation crawler (not shown in FIG. 2) operated by search server 160 can invert the annotation data in user database 166 to create an index of saved (annotated) pages. In saved page index 173, there is advantageously one entry per Web page, regardless of the number of users who saved that page. The entry can include annotation data from each of the annotations pertaining to that page. Particular indexing processes are not critical to the present invention, and a detailed description is omitted.

Query response module 162 is advantageously configured with search-related algorithms for processing and ranking Web pages relative to a given query (e.g., based on a combination of logical relevance, as measured by patterns of occurrence of search terms extracted from the query; context identifiers associated with search terms and/or particular pages or sites; page sponsorship; connectivity data collected from multiple pages; etc.). For example, query response module 162 may parse a received query to extract one or more search terms, then access page index 170 using the search terms, thereby generating a list of hits, i.e., pages or sites (or references to pages or sites) that are determined to have at least some relevance to the query. Query response module 162 may then rank the hits using one or more ranking algorithms. Particular algorithms for identifying and ranking hits given a query are not critical to the present invention, and conventional algorithms may be used.

In some embodiments of the present invention, query response module 162 is also configured to perform searches over saved pages using saved page index 173. Query response module 162 is advantageously configurable to search the page content and/or annotation data and may use conventional algorithms to identify and rank search hits based on the content of saved page index 173.

To support sharing of annotations among users, in one embodiment, a trust network module 165 in search server system 160 advantageously manages a trust network. Trust network module 165 in one embodiment provides an interface to client system 120 via which a registered user of search server 160 can define a list of "friends." Trust network module 165 stores each user's list of friends in that user's record in user database 166. In some embodiments, trust network module 165 also determines indirect relationships (friends of friends, etc.) on an as-needed basis; conventional database operations may be employed.

To enable search personalization features such as access to annotations, search server 160 advantageously provides a user login feature, where "login" refers generally to any procedure for identifying and/or authenticating a user of a computer system. Numerous examples are known in the art and may be used in connection with embodiments of the present invention. For instance, in one embodiment, each user has a unique user identifier (ID) and a password, and search server 160 prompts a user to log in by delivering to client 120 a login page via which the user can enter this information. In other embodiments, biometric, voice, or other identification and authentication techniques may also be used in addition to or instead of a user ID and password. Once the user has logged in, the user can create and/or update annotations by interacting with user annotation module 164 as described below. Further, each query entered by a logged-in user can be associated with the unique user ID for that user; based on the user ID, query response module 162 can perform searches of saved content items using saved page index 173. User login is advantageously persistent, in the sense that once the user has logged in (e.g., via client application 125), the user's identity can be communicated to search server 160 at any appropriate time while the user operates client application 125. Thus, personalization features described herein can be made continuously accessible to a user.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module and user annotation module described herein may be implemented on the same server or on different servers.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

In addition, in some embodiments, some modules and/or metadata described herein as being maintained by search server 160 might be wholly or partially resident on a client system. For example, some or all of a user's annotations could be stored locally on client system 120 and managed by a component module of client application 125. Other data, including portions or all of page index 170 and/or saved page index 173, could be periodically downloaded from search server 160 and stored by client system 120 for subsequent use. Further, client application 125 may create and manage an index of content stored locally on client 120 and may also provide a capability for searching locally stored content, incorporating search results including locally stored content into Web search results, and so on. Thus, search operations may include any combination of operations by a search server system and/or a client system.

C. Annotations

As noted above, the term "annotation" is used herein to refer to any descriptive and/or evaluative metadata related to a page or site (or other content item in a corpus) that is collected from a user and thereafter stored in association with an identifier and/or copy of the page or site. Annotations may include various fields of metadata, such as a rating (which may be any data indicating a favorable or unfavorable opinion) of the page or site, one or more keywords identifying a topic (or topics) of the page or site, a text description of the page or site, and/or other fields. Examples of techniques for collecting and storing annotations are described in above-referenced application Ser. No. 11/082,202; it is to be understood that a particular annotation structure is not critical to the present invention.

As used herein, a "page" refers to a unit of content that is identifiable by a unique locator (e.g., a URL) and displayable by a suitably configured browser program. A "site" refers to a group of one or more pages related to common subject matter and located on the same server. In some embodiments of the invention, the user who creates an annotation can indicate whether that annotation should apply to a single page or to a group of related pages (a site). In the latter case, the user can advantageously define the scope of the site. In some embodiments, there is no difference between a page annotation and a site annotation other than the number of pages to which the annotation potentially applies.

In one embodiment, each annotation is stored as an entry in user database 166. Information from the annotations, including visibility tokens, can be incorporated into page index 170 or into a separate saved page index 173 as described above.

D. Trust Networks

In some embodiments of the present invention, access rights to content items (e.g., annotations) are granted by reference to a trust network, or social network, that is defined among the users of a system. Trust networks are advantageously built up from trust relationships defined between various pairs of users. Each user can explicitly define trust relationships to one or more other users (referred to herein as "friends" of the first user). In some embodiments, all trust relationships are mutual (i.e., users A and B are friends only if both agree to trust each other); in other embodiments, one-way trust relationships can also be defined (i.e., user A can have user B as a friend regardless of whether user B has user A as a friend). Any user can define as a friend any other user with whom he or she is willing to share at least some annotations.

From the trust relationships defined by various users, a trust network can be built up. In general, a trust network can be represented by a network graph such as the network graph 300 shown in FIG. 3. Network graph 300 includes nodes 301-309, each of which represents a different user (users in examples herein are identified by letters A-I). The edges (arrows) connecting pairs of nodes represent trust relationships between the users; thus, user A trusts users B, C, D and I; user B trusts users C and E, and so on. In this example, the trust relationships are unidirectional; a bidirectional trust relationship (e.g., between users A and C) is represented using two edges.

It is to be understood that network graph 300 is illustrative. A trust network may include any number of users and any number of trust relationships, and one user may define trust relationships to any number of other users. The present description refers to trust relationships with N degrees of separation, where N is an integer is equal to the minimum number of directed edges connecting the users in the social network. N=1 corresponds to a direct trust relationship (e.g., the relationship between users A and B); N>1 corresponds to an indirect trust relationship (e.g., the relationship between users A and G, for which N=2).

In some embodiments of the present invention, user A can specify a visibility policy that makes her annotations (or other content items) available to her friends but not to their friends, or user A can specify a visibility policy that makes her annotations available to her friends and also to their friends. User B would be able to view those of user A's annotations that had either visibility policy, while user E would be able to view only those of user A's annotations that had the latter policy.

E. Visibility Policies

In system 100 described above, when the user saves an annotation, the user advantageously specifies a visibility policy (or privacy level) for the annotation. This visibility policy provides a rule for determining which, if any, other users should be allowed to see the annotation when they search or browse the shared library of annotations. Annotation module 164 generates a visibility token representing the annotating user and the specified visibility policy and stores the visibility token as part of the annotation. (Herein, a visibility token associated with a content item, such as an annotation, is sometimes referred to as a "content token"). As described below, the visibility token preferably has the property that the same token is generated each time the same user specifies the same visibility policy for an annotation.

Visibility tokens are also propagated to, or associated with, users of the system in accordance with the visibility policy each token represents. (Herein, a visibility token that is associated with a user is sometimes referred to as a "user token.") In one embodiment, a visibility token is propagated to a user by storing a corresponding token in a user record for the user in user database 166. As described below, decisions as to whether to grant access to a particular annotation to a particular user are made by determining whether any of the user tokens for that user matches a token associated with the annotation. It should be noted that because the visibility token is not specific to any annotation, propagation of user tokens can be carried out independently of associating visibility tokens with annotations.

In one embodiment, a visibility policy can specify a set of individual users who are granted access. Annotation module 164 or trust network module 165 adds a copy of the visibility token representing that policy to a user record for each user who has been granted access, thereby associating the visibility token with the appropriate users.

In another embodiment, a visibility policy can specify a rule for automatically determining which users are granted access. In preferred embodiments, the rule is specified in relation to the trust network (e.g., friends, friends of friends, etc.). In one embodiment, trust network module 165 periodically accesses user database 166 to obtain the list of a user's friends and propagates visibility tokens to the user's friends and, in some instances, to friends of the user's friends and so on depending on the particular visibility policy. In some embodiments, trust network module 165 automatically propagates appropriate tokens to related users when the trust network is updated, which in general does not correlate with when a user saves an annotation.

Propagation of tokens may occur in real time as trust network information is needed (e.g., when a user submits a query). Alternatively, tokens may be propagated under predetermined conditions and stored for subsequent use. For example, when a user updates his or her list of friends, tokens can be propagated from the user to any new friends added to the user's list of friends (and, if appropriate, to their friends as well), and tokens can also be removed from the record of any user who is removed from the user's list of friends.

When a user searches the store of annotated pages, query response module 162 advantageously applies a visibility filter to the search hits so that a querying user sees an annotated page only if one or more of the users who annotated the page have made their annotations visible to the querying user. In preferred embodiments, query response module 162 obtains the user tokens for the querying user and detects whether any of the user tokens match any of the content tokens associated with a hit page; if at least one match is detected, the page should be made visible to the querying user. Once it is determined that the page should be made visible, query response module 162 also uses the visibility tokens to determine which annotations should be made visible to that user. Thus, each user can control whether and to what extent his or her annotations are shared with other users. Examples of visibility filtering operations are described below.

It should be noted that, although the present description refers to embodiments where the content items are annotations of Web pages, the technique of providing access control based on matching user tokens to content tokens can be used with any type of content item that is to be shared among users, including but not limited to images and media files, bookmarks, ratings, essays, online journals (including but not limited to blogs) and any other type of content that can be shared.

In addition, the visibility token technique is well-suited for use where access control is based on relationships in a trust network. The visibility token associated with a content item is advantageously modified only when the item is first added to the library or if the posting user later decides to change the visibility rule for a previously posted item. The visibility tokens associated with users can be modified when the user-defined relationships to other users change without requiring an update to any index of the content items or other content store.

Examples of visibility policies that may be represented by tokens will now be described. It is to be understood that other visibility policies may be used in addition to or instead of these examples. In embodiments herein, the visibility policies used are "Private," "Selected," "Friends-1," "Friends-2," "Shared" and "Public."

A content item with a visibility policy of "Private" is visible only to its owner (i.e., the user who created or posted it). Thus, a user can keep some content items hidden from all other users while still posting them at search server 160. The "Private" policy allows users to store private content as well as shared content in user database 166 so that the user can search a single library that includes her own private content as well as shared content from other users.

A content item with a visibility policy of "Selected" is visible to its owner, and the owner can also explicitly define a list of other users who are to be granted access. For example, referring to FIG. 3, user A would be able to see user C's content items that user C had marked "Selected" only if user C had explicitly granted user A access to such items. Thus, an owner can keep some of his or her content items hidden from some of her friends. In one embodiment, an owner can define a single access list, and users on that list are granted access to all of the owner's content items that have the "Selected" policy. In another embodiment, the owner may define multiple access lists, and the visibility policy might be defined as "Selected-m," where m is an identifier of one of the owner's access lists.

A content item with a visibility policy of "Friends-1" is accessible to the owner as well as all of the owner's friends, and a content item with a visibility policy of "Friends-2" is accessible to the owner, the owner's friends, and friends of the owner's friends. For example, referring to the trust network of FIG. 3, if user A marks a content item as "Friends-1," the item would be visible to users B, C, D and I but not to users E, F, G and H. If user A marks another content item as "Friends-2," that item would be visible to users B, C, D, E, F, G and I but not to user H. More generally, a visibility policy of "Friends-n" for an arbitrary positive integer n could be defined to provide access to friends and friends of friends out to n degrees of separation.

A content item with a visibility policy of "Shared" can be seen by another user only if a mutual trust relationship exists between the owner and the other user. For example, referring again to FIG. 3, even though user A trusts user D, user D would not be able to see any of user A's "Shared" content items because user D does not trust user A. Users A and C, on the other hand, would each be able to see the other's "Shared" content items. In other embodiments, a "Shared-n" visibility policy could be defined for an arbitrary positive integer n to allow access to users at more than one degree of separation, provided a mutual trust relationship exists at each link. For instance, if user A had saved a content item with a visibility policy of "Shared-2," user B would be able to see that content item (because there is a mutual trust relationship between A and C and a mutual trust relationship between C and B) while user D would not. In some embodiments, use of the "Shared-n" policy to the exclusion of the "Friend-n" policy results in a content item being visible to a user only to the extent that a path of mutual trust exists between the user and the owner of the content item.

A content item with a visibility policy of "Public" is available to the maximum number of other users. In some embodiments, content items marked "Public" can be seen by any registered user (regardless of whether there is any direct or indirect trust relationship between the owner and the other user), and in other embodiments, content items marked "Public" can also be seen by non-registered users. In still other embodiments, the "Public" visibility policy is treated as being synonymous with a "Friend-n" policy for a suitably large value of n (e.g., n=3 or 4).

It will be appreciated that other visibility policies might be provided in addition to or instead of those described herein. In one such embodiment, an owner of a content item can make the item visible to all members of a well-defined group such as a Yahoo! Group by associating the content item with a visibility token that is propagated to all members of the group. In another embodiment, visibility policies might support different types of access for different users. For instance, an owner of a content item might be able to provide "write" access (the ability to view and modify the content item) to one set of users while providing "read-only" access (the ability to view but not modify the content item) to another set of users. As described below, any number and combination of visibility policies can be supported.

II. Setting Visibility Policies

Figure 4:
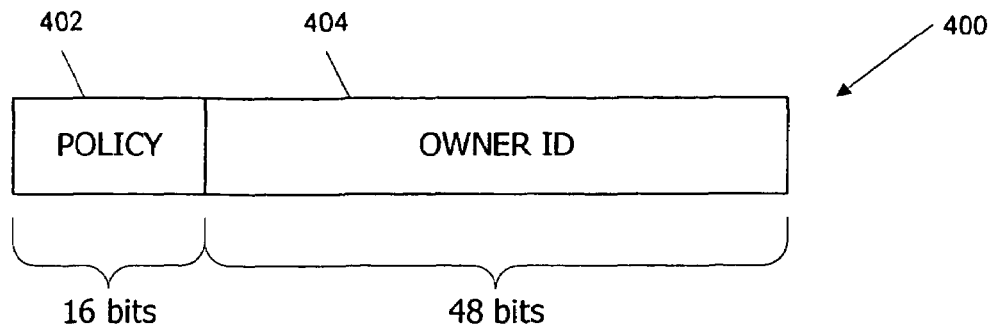
FIG. 4 illustrates a data structure for a visibility token according to an embodiment of the present invention.

In accordance with an embodiment of the present invention, visibility policies are enforced using visibility tokens in the manner described above. In some embodiments, a visibility token includes data that uniquely identifies an owner of the content item and a visibility policy; in examples used herein, visibility tokens are represented in a <policy/owner ID>format. In one embodiment, shown in FIG. 4, a visibility token 400 is a 64-bit data structure segmented into two fields. A 16-bit policy field 402 supports up to 65,536 possible visibility policies. A unique numerical value is assigned to each visibility policy, and the value in policy field 402 for a given token corresponds directly to a policy. In one embodiment, the numerical values are selected such that one of the bits in field 402 always indicates whether the policy provides read-only access or write access. The correspondence between numerical values and visibility policies is advantageously defined in a user-independent manner.

A 48-bit owner ID field 404 supports about 256 trillion owner IDs and is advantageously used to identify the owner of the content item. Each potential owner is assigned a unique owner ID value, which, in instances where the owner is also a user, may directly correspond to the user's user ID. In some embodiments, owner IDs can also be assigned to defined groups of users.

It will be appreciated that other visibility token formats may be substituted for the format described herein. A visibility token may include any desired fields and may have any length. It should be noted that a visibility token's value is not unique to a particular content item; an owner can associate the same visibility token with any number of content items, and a user with just one token can access any number of content items as long as each content item is associated with that token.

A. Associating Visibility Tokens with Content Items

Figure 5:
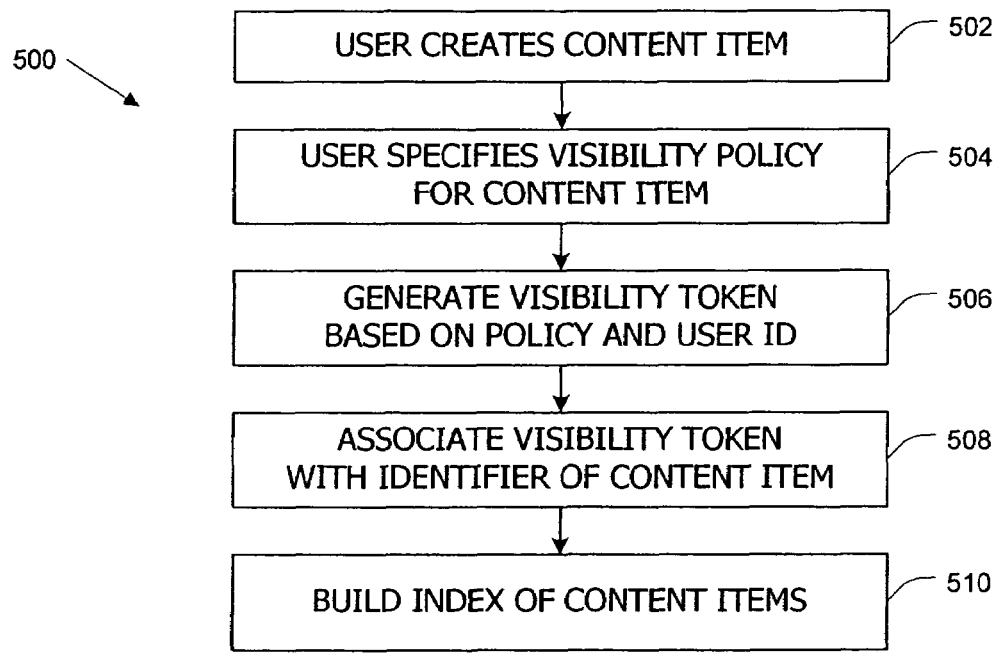
FIG. 5 is a flow diagram of a process for associating a visibility token with a content item according to an embodiment of the present invention.

FIG. 5 is a flow diagram of a process 500 for associating a visibility token with a content item according to an embodiment of the present invention. At step 502, a user creates or saves a content item, thereby becoming an owner of that item. For instance, the user might elect to save or annotate a Web page by interacting with annotation module 164 of search server 160 (FIG. 2) as described above. At step 504, the user specifies a visibility policy for the new content item. In some embodiments, the interface for creating or saving a new content item includes a menu of predefined visibility policies (e.g., "Private," "Selected," "Friend-1," etc.), and the user selects one of these policies.

At step 506, a visibility token for the content item is generated based on the visibility policy and the owner ID (which might also be the user ID) of the item's owner. In one embodiment, the token has the format shown in FIG. 4; other formats may also be used. The token format advantageously has the property that all content items having the same owner and the same visibility policy also have the same token. When the tokens have this property, it is not necessary to propagate new tokens to users every time a user creates a content item that is not marked "Private."

At step 508, the visibility token is stored in associated with the content item (or an identifier of the content item). In one embodiment, the content item is an annotation of a Web page as described above, and the visibility token is stored in user database 166 as part of an annotation record that also includes an identifier of the annotated Web page. Where multiple users annotate the same page, each annotation can be stored in user database 166 as a separate record with its own visibility token. Since each annotation record includes an identifier (e.g., URL) of the page to which it pertains, annotations pertaining to the same page can be recognized.

At step 510 an index of saved content items (e.g., saved page index 173 of FIG. 2) is generated. In one embodiment where the content items are annotations, all annotations pertaining to the same Web page are represented as a single entry in saved page index 173, and that entry includes the visibility token for each annotation. In some embodiments, the index is built incrementally as new content items are saved; in that embodiments, the index is periodically rebuilt from a store of content items such as user database 166.

It will be appreciated that process 500 is illustrative and that variations and modifications are possible. Steps described as sequential may be executed in parallel, order of steps may be varied, and steps may be modified or combined. A visibility token may be associated with any kind of content item that a user might create and save, including but not limited to annotations, Web pages, images, media files, etc.

B. Associating Visibility Tokens with Users

As noted above, visibility tokens are also associated with users, and a user's access rights (or lack thereof) to a given content item can be determined by detecting a match (or lack thereof) between one of the user's tokens and a visibility token associated with that content item. It should be noted that as long as the visibility token is specific to a visibility policy and not to a content item, associations between users and tokens can be created or modified independently of whether or when the token becomes associated with any content items. Thus, it is not necessary to update any user's tokens during process 500 (FIG. 5) or any other process for associating visibility tokens with content items.

As used herein, "propagation" of tokens refers generally to any algorithm used to establish associations between users (or user IDs) and visibility tokens. In some embodiments, the associations are established by storing visibility tokens in the user records in user database 166 (FIG. 2); other representations of associations between users and visibility tokens may also be used.

Token propagation can be handled in various ways, depending in part on the visibility policy represented by the token. For instance, if the visibility policy is "Private," then the visibility token is not propagated beyond its owner (in this context, the owner of a token is the user identified by the token's owner ID field). If the visibility policy is "Selected," the token is propagated only to users on the owner's access list. If the visibility policy is "Friend-n," the token is propagated to all of the creating owner's friends, as defined in the trust network, out to n degrees of separation. If the visibility policy is "Shared," the token is propagated only to users who are mutual friends with the owner, as defined in the trust network. If the content item is marked "Public," the token can be propagated to all registered users. In some embodiments, "Public" tokens are not propagated; instead, when the value representing a "Public" visibility policy is detected in a visibility token associated with a content item, the token is treated as a matching token for any user. In general, users can hold multiple tokens; for instance, in the network of FIG. 3, user B is a friend of users A and C and would hold a different user token from each.

Token propagation through the trust network can be implemented in various ways. In one embodiment, each user token has a propagation distance attribute, which indicates how much further (along social network edges) the token can propagate. For instance, a <Friend-2/A> token is initially associated with user A and has its propagation distance d set to 2. When the token is propagated from user A to user C, the propagation distance d in user C's copy is decremented to 1. When the token is further propagated to user G, the propagation distance d in user G's copy is decremented to 0. Since the propagation distance d is zero in user G's copy of the token, the token is not propagated from user G to user H (who is at three degrees of separation from user A). Where the supported visibility policies include "Friend-n" with multiple different values of n, the propagation distance d for each such token is advantageously initialized to n in the token associated with the creating user, then decremented each time the token propagates.

In some embodiments, at least some token propagation is performed on demand. For instance, the system might propagate "Friend" tokens one step initially, then use other mechanisms (e.g., database table join operations known in the art) to propagate the tokens further on an as-needed basis.

In preferred embodiments, token propagation also includes removing associations between users and visibility tokens when relationships cease to exist. For instance, if user A deletes user D from her list of friends, the <Friend-1/A> token should be removed from the user record for user D.

Where token propagation depends only on relationships among the users, token propagation can be performed when the relationships change and does not have to be repeated every time a user saves another content item. To the extent that users modify their relationships less often than they save content items, it can be more efficient to propagate tokens when relationships change rather than when content items are saved.

It should also be noted that as long as the token represents a valid visibility policy and user ID, a user can hold a token that does not match any token associated with any content item. For instance, a token representing <Shared/A> can be propagated to user A's mutual friends (user C in the network of FIG. 3) even before user A has assigned a "Shared" visibility policy to any content items; user C would hold the <Shared/A> token, but the token would not provide access to any content items.

The token matching paradigm for access control can also be used to manage a user's access to his own content items. In one embodiment, whenever a new user record is created, a complete set of "self tokens" is generated and included in the user record. A "self token" is a token whose policy field corresponds to a valid visibility policy and whose owner ID field corresponds to the user ID of the record in which the token resides; the complete set of self tokens includes a self token for every valid visibility policy. In other embodiments, each user is given a single "identity token" whose owner ID field maps to the user's own ID and whose policy field has a special value identifying the token as an identity token. The policy value representing an identity token advantageously does not match any other policy value. During access attempts, an identity token is treated as matching any visibility token as long as their owner ID fields match. Either of these techniques or other techniques may be used to provide a user with access to all of his or her own content items.

C. Token Matching

As explained above, when a user attempts to access a content item, the user token(s) associated with the user are compared to the content token(s) associated with the content item. If a match is detected, the user is granted access to the content item.

As used herein, a "match" between a content token and a user token occurs if that the content token and the user token satisfy a predefined matching test. In some embodiments, tokens match if and only if they have identical values. In other embodiments, a matching rule can be defined such that matches are detected in appropriate instances even if the values are not identical. For instance, in some embodiments, a <Friend-1/A> token would have a different value from a <Friend-2/A> token. Since the sharing scope of the "Friend-2" visibility policy includes all users with <Friend-1/A> tokens, the <Friend-1/A> user token can be recognized as a match to the <Friend-2/A> content token. Similarly, the identity token described above is a user token whose value is not identical to any content token, but using a suitable matching test, the identity token can be recognized as matching the content token. Matching rules that recognize matches between non-identical tokens can be defined using on lookup tables, comparison of selected bit positions in the token, or the like.

Where non-identical tokens are recognized as matching, the matching test advantageously depends on which is the user token and which is the document token. For instance, while it may be desirable for the <Friend-1/A> user token to be recognized as a match to the <Friend-2/A> content token, it is generally not desirable for the <Friend-2/A> user token to be recognized as a match to the <Friend-1/A> content token.

It is to be understood that recognizing matches where the tokens are not identical tends to reduce the number of tokens associated with each user but is not required. If only identical matches are recognized, a user who had the <Friend-1/A> user token might also have <Friend-2/A>, <Friend-3/A> and so on.

Figure 3:
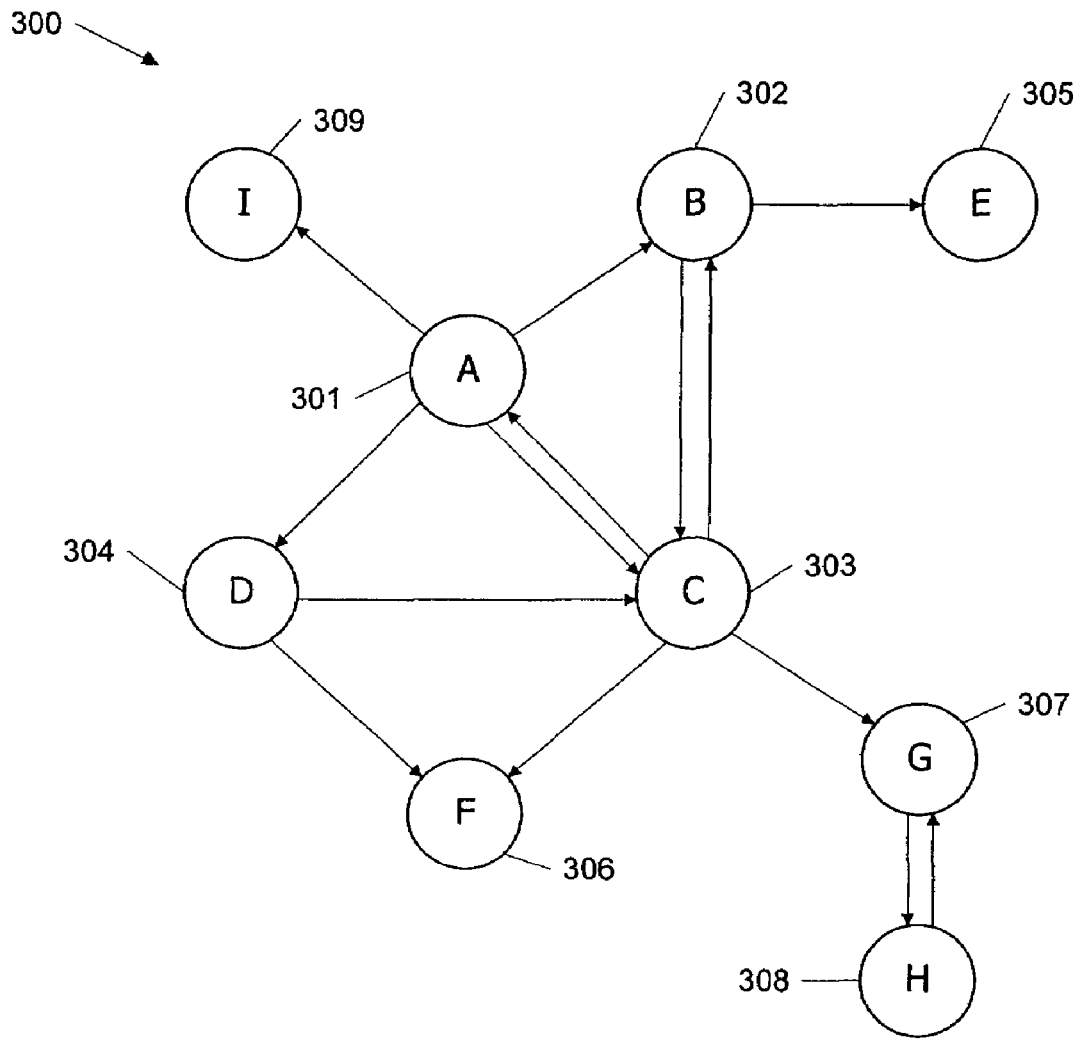
FIG. 3 is a network graph illustrating trust relationships among users.

To further clarify the foregoing description, FIGS. 6A-6C are tables illustrating an example of access control using visibility tokens according to an embodiment of the present invention. For purposes of this example, the trust network of FIG. 3 is used. A visibility token is represented in the format <policy/X>, where policy denotes a visibility policy that may be "Private" (pri), "Selected" (sel), "Friend-1" (f1), "Friend-2" (f2), "Group i" (gri), and "Public" (pub) and letter X denotes the owner ID (one of users A-I). The "Group i" visibility policy indicates that the content item should be made accessible to all current members of a well-defined group (e.g., a Yahoo! Group or e-mail distribution list) that is labeled with an identifier i (e.g., a unique numerical code); the other visibility policies have the meanings described above.

FIG. 6A represents, as a table 601, information that might be found in user records in user database 166 (FIG. 2). Column 602 lists each user (A through I) in the trust network of FIG. 3 and column 604 lists the tokens associated with that user. The tokens for "Friend-1" and "Friend-2" policies have been automatically propagated as far as possible through the trust network; it is to be understood that a user who holds token <f1/X> for another user X also holds token <f2/X>, since <f2/A> indicates visibility to all users at up to two degrees of separation from X, which logically includes users at one degree of separation from X In this example, it is also supposed that user D has an access list for the "Selected" visibility policy that includes user A and user B. Accordingly, the sel/D token has been propagated from user D to users A and B. It is to be understood that, although not explicitly shown in FIG. 6A, each user X holds a complete set of his or her own self tokens (or an identity token) as described above.

FIG. 6B represents, as a table 603, shared-library information about annotations that might be stored in user database 166 (FIG. 2). Column 662 lists identifiers 651-658 of different annotations, and column 664 lists, for each annotation, a page reference identifying a Web page 611-615 to which the annotation relates. It should be noted that multiple annotations related to the same Web page can be stored; for instance, annotations 652 and 653 both relate to page 612. Column 666 lists a content token associated with each annotation; the content token identifies the user who created the annotation and the visibility policy assigned by that user. For instance, annotation 651 was created by user A and assigned a "Private" visibility policy; annotation 652 was created by user H and assigned a "Private" visibility policy, and so on.

As shown in FIG. 6B, in some embodiments a user can assign multiple visibility policies to an annotation (or other content item); such an annotation has multiple visibility tokens associated with it. For instance, annotation 654 has content tokens <f2/A> and <gr1/A>. Annotation 654 is visible to user A (who created it) as well as to users B, C, D, E, F, G and I due to the <f2/A> token. It would also be visible to user H due to the <gr1/A> token if user H happened to be a member of Group 1 (which is not the case in this example). It should be noted that all since only one user creates the annotation, only that user's content tokens would be applied to it.

Column 668 lists the users to whom each annotation is visible; this information is derived by identifying which users in table 601 have tokens matching the content token in column 666.

FIG. 6C represents, as a table 605, index information that might be stored in saved page index 173 (FIG. 2). This information can be generated from table 603 of FIG. 6B. Column 610 lists each Web page 611-615 that has been annotated by at least one of users A-I; in table 605, there is one entry per Web page regardless of the number of annotations. Column 620 lists the content tokens associated with each page 611-615. Where multiple users annotated a page, multiple content tokens appear in column 620. For instance, page 613 has three annotations 654, 655, 656 in table 603 (FIG. 6B); the respective content tokens are all listed in table 605. Column 630 lists the users to whom the page would be a visible hit in a search of page index 173; this listing is derived from the visibility tokens in column 620 and the user tokens in column 604 (FIG. 6A). Page 611 has only the <pri/A> token and is visible only to user A. Page 612 has the <pri/H> token, which makes it visible only to user H, but page 612 also has the <pub/B> token, making it visible to all users. Page 613 has the <f2/A>, <f2/B> and <f1/C> tokens and is visible to all users except user H since all users except H have at least one of these tokens. Page 614 has the <f2/D> token and is visible to users C, D, F and G, each of whom has <f1/D> or <f2/D> tokens. Page 615 has the <sel/D> token and is visible to users A, B and D.

It should be noted that in this embodiment when a page is visible as a hit to a given user, it does not necessarily follow that all of the annotations associated with that page are visible to the user; the set of annotations visible to a given user is determined from table 603. For instance, column 630 of table 605 indicates that page 613 is visible to user D. However, as shown in table 603, of the three annotations 654, 655, 656 related to page 613, only annotation 654 would be visible to user D. All three annotations 654, 655, 656 would be visible to user A.

It will be appreciated that this example is illustrative. Any number of users may participate in a shared content system including any number of content items, and any number and combination of visibility policies may be supported. Further, the content items are not limited to being Web pages or annotations of Web pages; access to any type of content items can be managed using visibility tokens. Those skilled in the art will also recognize that table 605 of FIG. 6C might also be used in other embodiments where multiple posting users can affect the visibility of a content item to a querying user; in embodiments where access to a content item is under exclusive control of one user, the visibility of content items can be determined directly from table 603.

III. Visibility Tokens in Search and Annotation System

Visibility tokens provide a general mechanism for access control. As described above, any time a user attempts to access a content item, the token(s) associated with the user and the token(s) associated with the content item are compared. If a match between a user token and a content token is detected, the user is allowed to access the content item; if not, the access is denied. In addition, in some embodiments, if a user requests write access to a content item but does not have a matching token that grants write access, the write access is denied even if the user has a matching token granting read access.

In some embodiments, visibility tokens are used in generating search results when users search a shared library of saved content items, such as the library of annotated Web pages represented in page index 173 of FIG. 2. When a querying user searches this library, that user should only see Web pages that have been annotated with at least one annotation to which the querying user has been granted access.

Figure 7:
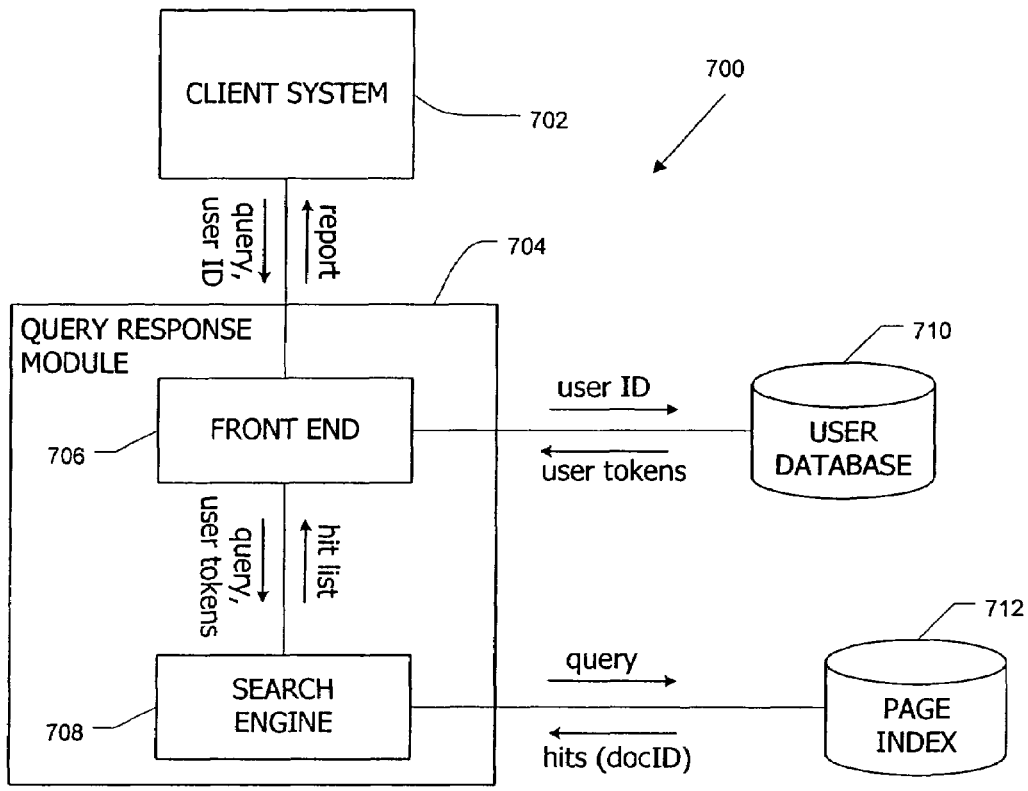
FIG. 7 is a block diagram of a search system according to an embodiment of the present invention.

FIG. 7 is a block diagram of a system 700 configured to execute a search over a shared library of saved (annotated) Web pages such as page index 173 of FIG. 2 according to an embodiment of the present invention. System 700 includes a client system 702 operated by a user. Client system 702, which may be generally similar to client system 120 of FIG. 2, communicates with a query response module 704, which may be implemented, e.g., as query response module 162 in search server 160 of FIG. 2.

Query response module 704 includes a front end 706 that manages communication with client system 702 and also interacts with a search engine 708 that executes queries. Front end 706 accesses a user database 710 (which in one embodiment corresponds to user database 166 of FIG. 2), and search engine 708 accesses a saved page index 712 (which in one embodiment corresponds to saved page index 173 of FIG. 2).

Figure 8:
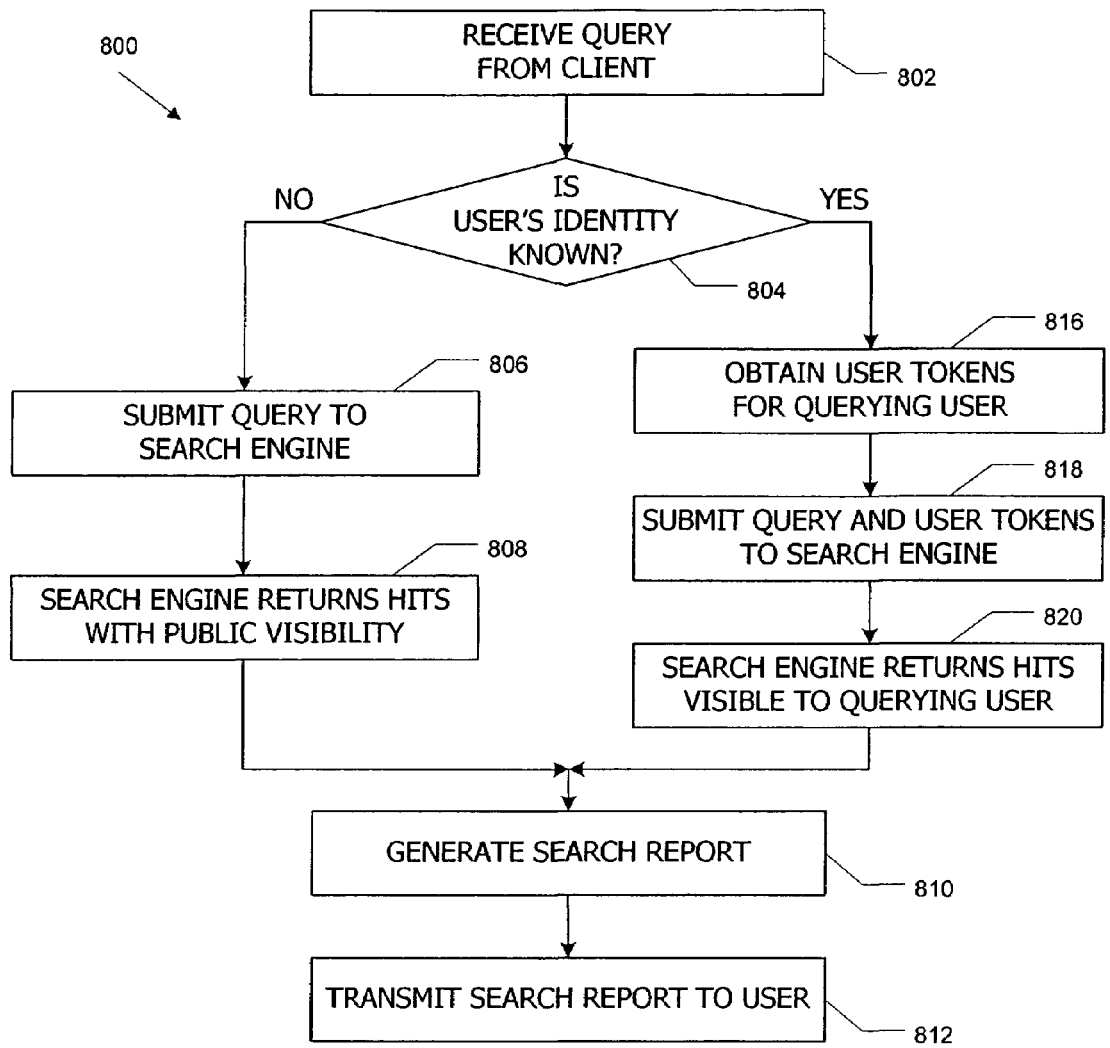
FIG. 8 is a flow diagram of an operating process for a search system according to an embodiment of the present invention.

Operation of system 700 will now be described with reference to FIG. 8, a flow diagram of an operating process 800 performed by front end 706 according to an embodiment of the present invention. At step 802, front end 706 receives a query from client system 702. At step 804, front end 706 determines whether the user's identity is known. If the querying user is logged in to the search system, the query advantageously includes or is otherwise associated with the user ID of the querying user, and step 804 includes extracting a user ID from the received query. In some embodiments, if the user's ID is not associated with the query, front end 706 transmits a message to client 702 prompting the user to log in during step 804.

If the user's identity is not known (or ascertained) at step 804, the query can be processed as an anonymous query. More specifically, at step 806, front end 706 submits the query to search engine 708. Search engine 708 processes the query using generally conventional techniques to identify hits, then filters the hits to include only those pages that are associated with a "Public" visibility token. Examples of filtering techniques are described below. At step 808, search engine 708 returns the filtered list of hits to front end 706, which generates a search report (e.g., as described in above-reference application Ser. No. 11/082,202) at step 810 and transmits the report to the user at step 812. In an alternative embodiment, if the user's identity is not known (or ascertained) at step 804, front end 706 rejects the query, e.g., by sending client 702 a message indicating that access to the shared library is limited to registered users, and steps 806 and 808 are not performed.

If, at step 804, the user's identity is ascertained, then at step 816, front end 706 accesses user database 710 to obtain the set of visibility tokens associated with the querying user. At step 818, front end 706 submits the query and the user tokens to search engine 708. Search engine 708 processes the query using generally conventional techniques to identify hits and filters the hits to include only those pages that are associated with one of the user tokens. Examples of filtering techniques are described below. At step 820, search engine 708 returns the filtered list of hits to front end 706. Front end 706 generates a search report at step 810 and, at step 812, transmits the search report to the user.

It will be appreciated that the search process described herein is illustrative and that variations and modifications are possible. Steps described as sequential may be executed in parallel, order of steps may be varied, and steps may be modified or combined. For instance, in one embodiment search engine 708 returns the matched visibility tokens associated with each hit to front end 706, and generating the search report can include reranking the hits based on information about the matched tokens and/or incorporating into the search report information from annotations visible to the querying user.

In some alternative embodiments, search engine 708 returns hits that have not been filtered for visibility according to the querying user's tokens, and visibility filtering is performed in front end 706 rather than in search engine 708. It should be noted, however, that where the total number of content items becomes large, post-filtering in front end 706 can be less efficient than filtering within search engine 708. For instance, search engine 708 might identify thousands or millions of hits, only a few dozen of which are visible to a querying user. Processing can be simplified, and communication can be faster, if search engine 708 filters out the invisible hits before returning any information to front end 706.

Examples of filtering techniques that can be implemented in search engine 708 will now be described. In some embodiments, search engine 708 filters the hits using a visibility token cache that is indexed by a content-item identifier (Doc_ID), such as a URL or an encoded version thereof. For each Doc_ID in the visibility token cache, a cache entry stores all of the visibility tokens associated with that Doc_ID. Caching the visibility tokens for a given content item makes them readily accessible to search engine 708 and can improve the speed of filtering operations as compared to repeatedly retrieving the tokens from page index 712.

Figure 9:
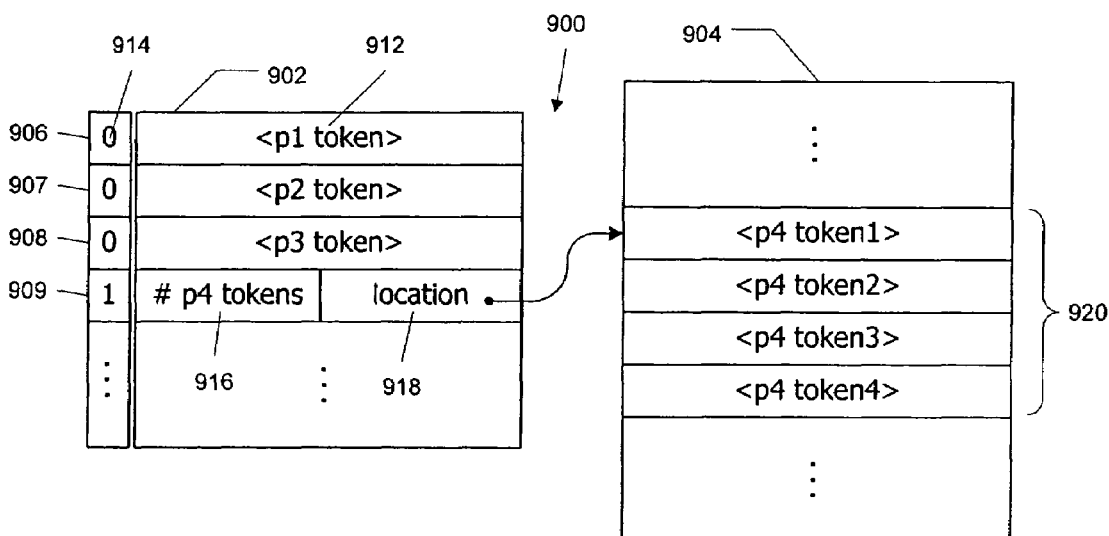
FIG. 9 is a block diagram illustrating a cache structure that may be used to implement a visibility token cache according to an embodiment of the present invention.

FIG. 9 is a block diagram illustrating a cache structure 900 that may be used to implement a visibility token cache according to an embodiment of the present invention. Cache structure 900 includes a main cache table 902 and an overflow array 904. Main cache table 902 is indexed by Doc_ID (not explicitly shown), such that each row 906-909 represents the tokens for a different content item. More specifically, each row 906-909 includes a field 912 large enough to store one token (e.g., 64 bits) and a status bit 914. If the document has only one associated token, status bit 908 is set to zero, and token field 912 stores the token's value. If the document has two or more associated tokens, status bit 908 is set to 1 as shown in row 909, and token field 912 is used to store a token count 916 (e.g., 31 bits) indicating the number of tokens associated with the document and a location pointer 918 (e.g., 32 bits). The tokens themselves are stored in contiguous locations 920 in overflow array 904, and location pointer 918 is a pointer or other reference to the first location 920.

Figure 10:
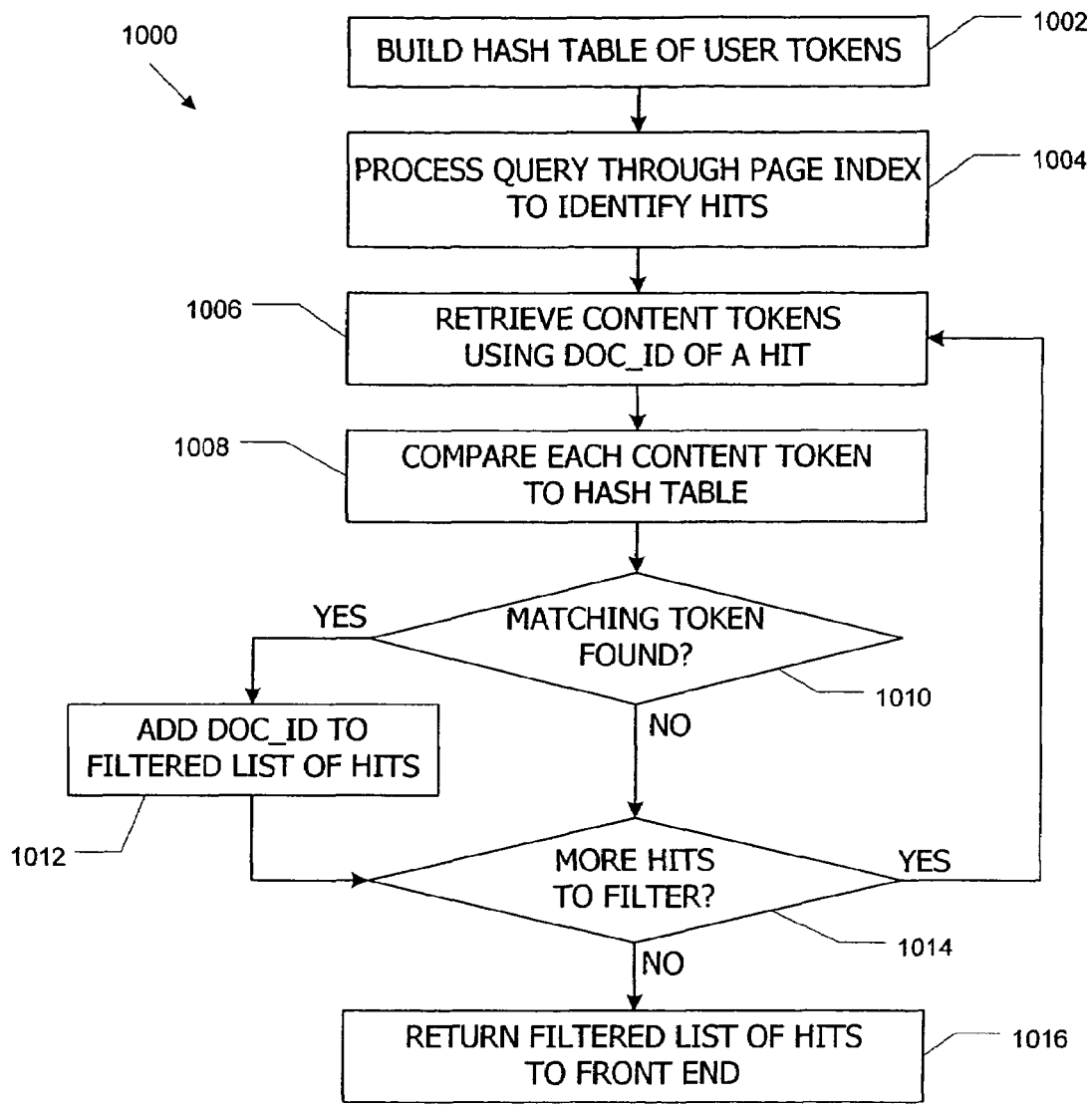
FIG. 10 is a flow diagram of a search and filtering process using a visibility token cache according to an embodiment of the present invention.

FIG. 10 is a flow diagram of a filtering process 1000 that maybe implemented in search engine 708 of FIG. 7 using visibility token cache 900 of FIG. 9 according to an embodiment of the present invention. At step 1002, search engine 708 builds a hash table from the set of user tokens received from front end 706. At step 1004, search engine 708 processes the query through page index 712 to identify content items that satisfy the query. Query processing at step 1004 may be performed using conventional techniques, such as detecting the occurrence of a query string in the text of a document. For each content item that satisfies the query (referred to herein as a "hit"), the Doc_ID is retrieved.

At step 1006, search engine 708 retrieves the visibility tokens corresponding to one of the hits. If the hit is in cache 900, which can be determined by a lookup operation using the Doc_ID of the hit, the tokens are advantageously retrieved from cache 900. If the hit is not in cache 900, the tokens can be retrieved from page index 712.

At step 1008, search engine 708 compares the retrieved visibility tokens to the hash table from step 1002 to detect a matching token. If, at step 1010, a matching token is found, the Doc_ID is added to the filtered list of hits (step 1012); if not, the document ID is dropped. At step 1014, search engine 708 determines whether other hits remain to be filtered. If so, process 1000 returns to step 1006 to filter the next hit. If not, then at step 1016, search engine 708 returns the filtered list of hits to front end 706.

The visibility filter cache can be used, e.g., where relatively few content items are associated with multiple tokens. The hash table of user tokens can be implemented using any hash function(s) that reliably detect a match between a content item's token and any of the user tokens. In embodiments where users also typically have a small number of tokens, the hash table might not be used, e.g., if a direct comparison of the content item's token to each user token is more efficient.

In other embodiments, filtering is done by reformulating the query (Q) within search engine 708 as a filtered query Q' defined as:

$$Q'=Q\&\& \text{ (token 1}\|\text{token 2}\|\ldots\|\text{ token }M),$$

where && is a logical AND operator, || is a logical (inclusive) OR operator, and "token 1" to "token M" are the user tokens received from front end 706. The filtered query Q' is then executed using conventional query processing techniques. Those skilled in the art will recognize that a content item satisfies filtered query Q' only if it satisfies Q and also has at least one visibility token that matches one of the user tokens. The results of query Q' are already filtered, and a separate filtering step is not required.

Where the total number (M) of user tokens is large, processing filtered query Q' can become cumbersome. To improve efficiency, one variation on this approach uses a visibility filter cache to handle filtering for queries where M is large. The visibility filter cache is indexed by token set (i.e., {token 1, token 2, ..., token M}) and stores, for each token set, a bit vector indexed by Doc_ID. If the Doc_ID corresponding to a given bit position is associated with at least one of the tokens in the token set, then the bit at that position is set to logical true (e.g., 1); otherwise the bit is set to logical false (e.g., 0). In general, each token set will correspond to one user (although in some embodiments it is possible for two or more users to have the same token set). The visibility cache can be made large enough to accommodate up to some preselected maximum number of querying users at once; a cache entry for a user can be built when the user executes a first query and reused for subsequent queries for as long as the entry remains in the cache.

Figure 11:
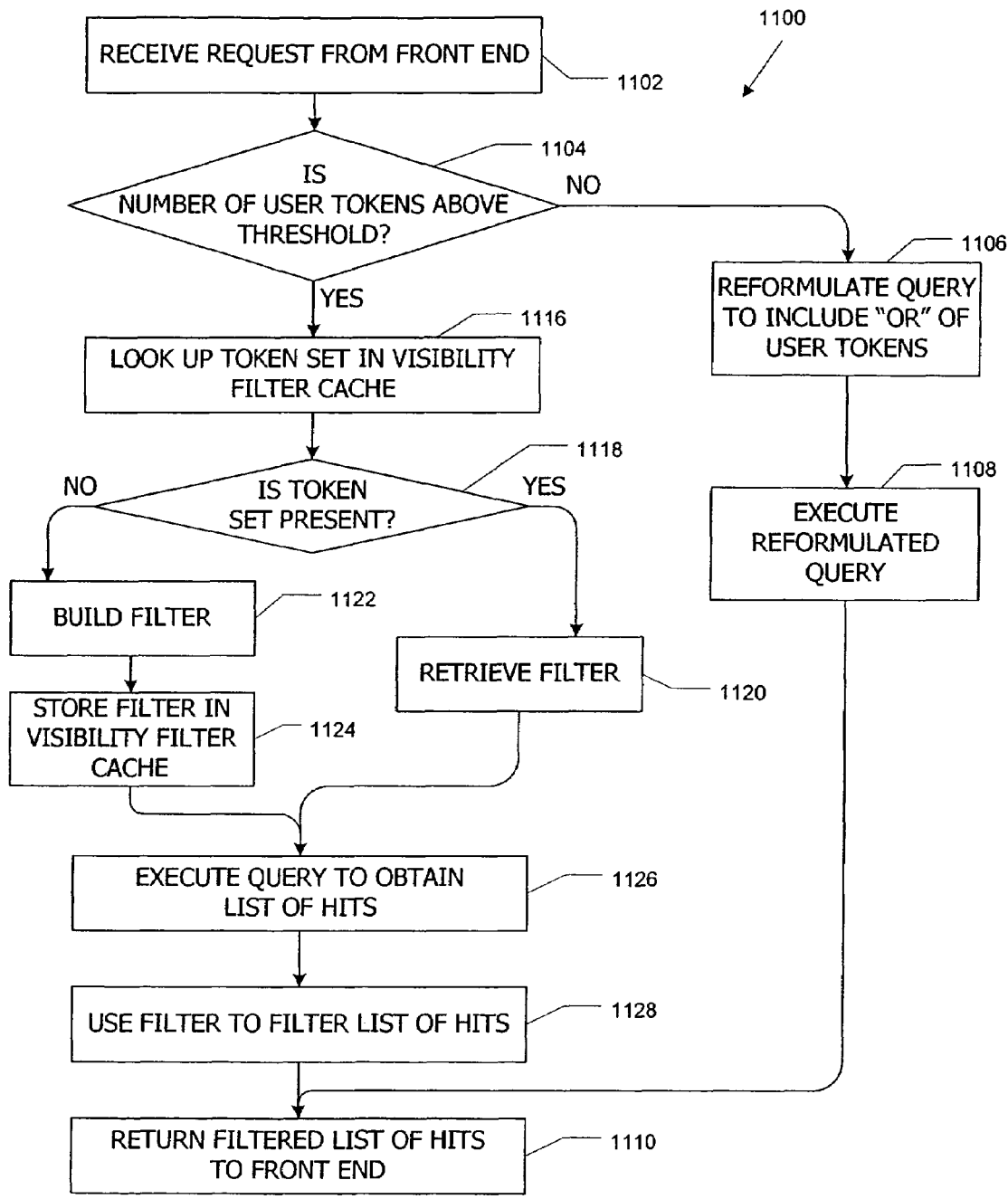
FIG. 11 is a flow diagram of a search and filtering process using a visibility filter cache according to an embodiment of the present invention.

FIG. 11 is a flow diagram of a process 1100 that may be implemented in search engine 708 of FIG. 7 using a visibility filter cache according to an embodiment of the present invention. At step 1102, search engine 708 receives a request from front end 706. The request includes a query and a set of user tokens. At step 1104, search engine 708 determines whether the number M of user tokens exceeds a threshold (e.g., 3, 5, 10 or some other value that may be selected based on properties of search engine 708 in a given implementation).

If the number M does not exceed the threshold, then at step 1106, search engine 708 reformulates the query Q as a filtered query Q' as described above. At step 1108, search engine 708 executes the filtered query Q', e.g., using conventional techniques, to obtain a filtered list of hits. At step 1110, the filtered list of hits is returned to front end 706.

Returning to step 1104, if the number M exceeds the threshold, then at step 1116, search engine 708 looks up the token set {token 1, token 2 ..., token M} in the visibility filter cache. If, at step 1118, the token set is present in the cache, search engine 708 retrieves the corresponding visibility filter (bit vector) at step 11120. If the token set is not present, search engine 708 builds a new visibility filter (bit vector) at step 1122, e.g., by accessing saved page index 712, and stores the new visibility filter in the visibility filter cache at step 1124. Conventional cache management techniques may be used to implement step 1124. At step 1126, the query Q is executed to generate an unfiltered list of hits. At step 1128, the list of hits is filtered using the (retrieved or new) visibility filter. In this instance, filtering includes reading the bit in the bit vector that corresponds to the Doc_ID of the hit and determining from that bit whether the content item is visible or not. The filtered list of hits is returned to front end 706 at step 1110.

It will be appreciated that the filtering processes described herein are illustrative and that variations and modifications are possible. Steps described as sequential may be executed in parallel, order of steps may be varied, and steps may be modified or combined. In some embodiments, cache entries can be replaced in accordance with a least recently used algorithm; other conventional cache management techniques may be employed. In other embodiments, cache entries might also time out and be deleted after a certain period in order to prevent cached information from becoming out of date.

IV. Further Embodiments

As described above, embodiments of the present invention provide a way to manage visibility of content items in a multi-user system by using visibility tokens that can be associated with content items and also with individual users of the system. Because multiple visibility tokens can be associated with one content item, the techniques described above are well adapted for situations where access to a particular content item is not granted or denied at the sole discretion of one user, as is the case for the shared annotation system used as an example herein. However, the present invention is not limited to this context and can be adapted for use in any multi-user computer system where access control on a per-file basis is desired.

While the invention has been described with respect to specific embodiments, one skilled in the art will recognize that numerous modifications are possible. For instance, while embodiments described herein refer to annotations of Web pages as content items, the access management techniques described herein can also be employed to control access to other types of content items, including Web pages themselves, images, media files, documents, spreadsheets, and so on.

In other embodiments, token-based access control can be implemented to automatically allow access to all users who belong to a well-defined group such as a Yahoo! Group, an e-mail distribution list, or the like. For example, a unique visibility token can be defined for each group. In one embodiment, visibility tokens for groups are defined as in FIG. 4 above, with the policy field storing a "Group" value that is the same for all groups and the owner ID field storing to a value uniquely associated with a particular group. Any user who is a member of the group can associate the group's visibility token with content items. Every user who is a member of the group can be associated with the group's visibility token through an automatic token propagation process, thereby granting all group members access to the content item. In this embodiment, the visibility token does not uniquely identify the user who created or saved a particular content item; information as to which group member actually created or saved an item associated with the group's token can be stored in another metadata field of the content item if desired.

In some embodiments, visibility tokens can be used to block annotations or other content items owned by a first user from being seen by a second user. For instance, the second user (e.g., user A) can maintain a "Blocked" list of users whose content items she desires not to see and include the first user (e.g., user B) on the list. During token propagation, any visibility tokens whose owner ID corresponds to user B are blocked from being added to user A's user record. Lacking the appropriate token, user A would not see user B's content items, and user B's tokens would not be propagated from user A to her friends. Alternatively, such tokens might be present in user A's record with a "do not use" flag set; such tokens could be propagated to the user A's friends in accordance with the appropriate token propagation rules, but any tokens marked "do not use" would be ignored when determining whether to make a content item visible to user A.

Visibility tokens can have any format and can be propagated to users in any manner. In embodiments where at least some token propagation is automatic, the token advantageously includes information specifying the visibility policy so that rules for propagating the token can be automatically determined.

The embodiments described herein may make reference to Web pages or sites, URLs, links, and other terminology specific to instances where the World Wide Web (or a subset thereof) serves as a corpus of content items. It should be understood, however, that the systems and methods described herein can be adapted for use with a different corpus (such as an electronic database or document repository).

Computer programs incorporating various features of the present invention may be encoded on various computer readable media for storage and/or transmission; suitable media include magnetic disk or tape, optical storage media such as CD or DVD, flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method for sharing content items among a plurality of users, the method comprising:
    defining a first user token and a first content token, the first user token and the first content token each representing a first visibility policy for determining which of the plurality of users are granted access to content items posted by a first one of the plurality of users, wherein the first user token and the first content token are matching tokens;
    associating the first user token with each user who is granted access to content items according to the first visibility policy;
    receiving a visibility instruction for a first content item from the first user, the visibility instruction indicating that the first content item should be shared according to the first visibility policy; and
    in response to the visibility instruction, associating the first content token with the first content item in an index of content items, wherein when one of the plurality of users requests access to the first content item, the request is granted or denied based on whether the first content token matches a user token associated with the requesting user.

2. The method of claim 1 wherein the content items comprise annotations created by the users, wherein each annotation is associated with a subject document to which the annotation relates.

3. The method of claim 2 wherein the subject document is a Web page.

4. The method of claim 1 wherein the first user token and the first content token are identical tokens.

5. The method of claim 1 further comprising:
    receiving a query from a querying one of the plurality of users; and
    in response to the query, selecting one or more content items from the index to return as search hits, wherein the first content item is not selected as a search hit unless the querying user is associated with a user token that matches the first content token.

6. The method of claim 1 further comprising:
    defining a second user token and a second content token, the second user token and the second content token each representing a second visibility policy for determining whether a particular one of the plurality of users is granted access to content items posted by the first user, wherein the second user token and the second content token are matching tokens; and
    associating the second user token with each user who is granted access to content items according to the second visibility policy.

7. The method of claim 6 wherein the second user token also matches the first content token but the first user token does not match the second content token.

8. The method of claim 6 further comprising:
receiving a visibility instruction for a second content item from the first user, the second visibility instruction indicating that the second content item should be shared according to the second visibility policy; and
in response to the visibility instruction for the second content item, associating the second content token with the second content item in the index of content items, wherein when one of the plurality of users requests access to the second content item, the request is granted or denied based on whether the second content token matches a user token associated with the user.

9. The method of claim 1 wherein the act of associating the first user token with each user who is granted access to content items according to the first visibility policy is performed automatically.

10. The method of claim 9 wherein the first visibility policy is defined by reference to a maximum degree of separation in a trust network connecting the first user to others of the plurality of users.

11. The method of claim 9 wherein the maximum degree of separation is at least one and the act of associating the first user token with each user who is granted access to content items according to the first visibility policy comprises:
accessing trust network data for the trust network to identify one or more users who are friends of the first user; and
associating the first user token with each of the friends of the first user.

12. The method of claim 11 wherein the maximum degree of separation is at least two and the act of associating the first user token with each user who is granted access to content items according to the first visibility policy further comprises:
accessing trust network data for the trust network to identify one or more users who are friends of the friends of the first user; and
associating the first user token with each of the friends of the friends of the first user.

13. A method of searching a corpus of shared content items posted by a plurality of users, the method comprising:
receiving a query from a querying one of the plurality of users, wherein the querying user is associated with a set of user tokens, each user token representing a visibility policy under which the querying user is granted access to content items posted by one of the plurality of users;
accessing an index of the shared content items, wherein each shared content item in the index is associated with a content token that represents a visibility policy for determining which of the plurality of users are granted access to content items posted by one of the plurality of users;
identifying, from the index, at least one of the shared content items as a search hit that satisfies the query;
applying a visibility filter to each of the search hits, wherein the visibility filter is satisfied in the event that the search hit is associated with a content token that matches a user token in the set of user tokens associated with the querying user; and
returning to the querying user a list of search hits that satisfy the visibility filter.

14. The method of claim 13 wherein the acts of receiving the query and returning the list of search hits are performed by a front end module configured to communicate with a user system and the acts of accessing the index, identifying the search hits and applying the visibility filter are performed by a search engine communicably coupled to the front end module.

15. The method of claim 13 wherein the act of applying the visibility filter comprises:
building a hash table based on the one or more user tokens associated with the querying user; and
for each search hit, comparing the content tokens associated with the search hit to the user tokens using the hash table.

16. The method of claim 15 further comprising retrieving the content tokens associated with one of the search hits from the index.

17. The method of claim 15 further comprising retrieving the content tokens associated with one of the search hits from a visibility token cache.

18. The method of claim 13 wherein the act of applying the visibility filter comprises:
constructing a visibility bit vector based on the set of user tokens associated with the querying user, wherein each bit in the visibility bit vector corresponds to one of the shared content items in the corpus and wherein the value of each bit indicates whether the corresponding one of the shared content items has an associated content token that matches any of the user tokens in the set of user tokens; and
for each search hit, using the value of the corresponding bit in the bit vector to determine whether the shared content item is visible to the querying user.

19. The method of claim 18 further comprising:
storing the visibility bit vector in association with the set of user tokens in a visibility filter cache from which the visibility bit vector is retrievable by reference to the set of user tokens; and
in response to a subsequent query from the querying user, retrieving the visibility bit vector from the visibility filter cache.

20. A method of searching a corpus of shared content items posted by a plurality of users, the method comprising:
receiving a query from a querying one of the plurality of users, wherein the querying user is associated with a set of user tokens, each user token representing a visibility policy under which the querying user is granted access to content items posted by one of the plurality of users;
reformulating the query to include the received query and a logical OR of the one or more user tokens associated with the querying user;
accessing an index of the corpus of shared content items, wherein each shared content item in the index is associated with a content token that represents a visibility policy for determining which of the plurality of users are granted access to content items posted by one of the plurality of users;
processing the reformulated query by reference to the index, thereby identifying one or more visible search hits from the corpus of shared content items, wherein each visible search hit is a content item from the corpus that satisfies the received query and that is associated with a content token that matches a user token in the set of user tokens associated with the querying user; and
retiring a listing of the visible search hits to the user.

21. The method of claim 20 wherein the acts of receiving the query and returning the listing of the visible search hits are performed by a front end module configured to communicate with a user system and the acts of reformulating the query, accessing the index and processing the reformulated query are performed by a search engine communicably coupled to the front end module.

22. A computer system for sharing content items among a plurality of users, the system comprising:
- a user data store configured to store a user record for each of the plurality of users, wherein the user record for each user comprises one or more user tokens associated with that user, each user token representing a visibility policy under which that user is granted access to content items posted by one of the plurality of users;
- a content data store configured to store an item record for each of the shared content items, wherein each item record comprises one or more content tokens, each content token representing a visibility policy for determining which of the plurality of users are granted access to content items posted by one of the plurality of users;
- posting control logic configured to receive a visibility instruction for a first one of the shared content items from a first one of the plurality of users, the visibility instruction indicating that the first content item should be shared according to a first visibility policy, and to store a first content token in the item record for the first shared content item, the first content token representing the first visibility policy; and
- access control logic configured to receive a request from a requesting one of the plurality of users to access the first shared content item and to grant access in the event that one of the user tokens in the user record for the requesting user matches a content token associated with the first content item.

23. The computer system of claim 22, further comprising:
token propagation control logic configured to automatically determine which user records should include each user token based on the visibility policy and the trust network data and to automatically add user tokens to user records based on the automatic determination; and wherein the user record for each user further comprises trust network data identifying one or more other users as being friends of that user and wherein each user token represents a visibility policy that is defined by reference to a maximum degree of separation in the trust network from a posting user.

24. A computer system for searching a corpus of shared content items posted by a plurality of users, the system comprising:
- a user data store configured to store a user record for each of the plurality of users, wherein the user record for each user comprises one or more user tokens associated with that user, each user token representing a visibility policy under which that user is granted access to content items posted by one of the plurality of users;
- a content data store configured to store an item record for each of the shared content items, wherein each item record comprises one or more content tokens, each content token representing a visibility policy for determining which of the plurality of users are granted access to content items posted by one of the plurality of users;
- a front end module configured to receive a query from a querying one of the plurality of users, to extract from the user data store a set of user tokens associated with the querying user, and to return a search report comprising a listing of search hits to the querying user; and
- a search engine communicably coupled to the front end module and configured to receive the query and the set of user tokens from the front end module, to identify content items that satisfy the query and that are visible to the querying user, and to return the identified content items as search hits to the front end module, wherein the search engine is further configured to determine whether a content item is visible to the querying user by determining whether the content item is associated with a content token that matches a user token in the set of user tokens.

* * * * *

UNITED STATES PATENT AND TRADEMARK OFFICE
CERTIFICATE OF CORRECTION

PATENT NO. : 7,594,258 B2 Page 1 of 1
APPLICATION NO. : 11/169178
DATED : September 22, 2009
INVENTOR(S) : Mao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Twenty-eighth Day of September, 2010

David J. Kappos
*Director of the United States Patent and Trademark Office*